United States Patent
Liu

(10) Patent No.: US 8,419,287 B2
(45) Date of Patent: Apr. 16, 2013

(54) AXLE BEARING LUBRICATING AND COOLING SYSTEM

(75) Inventor: Chen-San Liu, Taoyuan County (TW)

(73) Assignee: Yen Chen Machinery Co., Ltd., Taoyuan County (TW)

( * ) Notice: Subject to any disclaimer, the term of this patent is extended or adjusted under 35 U.S.C. 154(b) by 499 days.

(21) Appl. No.: 12/768,682

(22) Filed: Apr. 27, 2010

(65) Prior Publication Data
US 2011/0262068 A1 Oct. 27, 2011

(51) Int. Cl.
*F16C 33/66* (2006.01)

(52) U.S. Cl.
USPC ............ 384/462; 384/467; 384/472; 384/474

(58) Field of Classification Search .................. 384/462, 384/467, 472, 476, 474
See application file for complete search history.

(56) References Cited

U.S. PATENT DOCUMENTS

| | | | | |
|---|---|---|---|---|
| 2,789,021 A | * | 4/1957 | Pedersen | 384/461 |
| 4,541,738 A | * | 9/1985 | Leibensperger et al. | 384/470 |
| 4,596,476 A | * | 6/1986 | Schill et al. | 384/467 |
| 5,779,005 A | * | 7/1998 | Jones et al. | 184/6.18 |
| 6,921,211 B2 | * | 7/2005 | Olsson et al. | 384/480 |

* cited by examiner

*Primary Examiner* — Phillip A Johnson

(57) ABSTRACT

An axle bearing lubricating and cooling system includes a shaft and an axle bearing that has an inner race fixedly mounted around the shaft, an outer race and a plurality of movable members movably set in between the inner race and the outer race, a casing fixedly connected with the outer race of the axle bearing for enabling two distal ends of the shaft to extend out of the casing, casing having a fluid inlet for guiding a cooling fluid from an external cooling fluid source through the gap in between the outer race and inner race of the axle bearing and a fluid outlet located for guiding the cooling fluid out of the casing, and an impeller rotatable with the shaft for forcing the cooling fluid out of the axle bearing toward the fluid outlet.

4 Claims, 11 Drawing Sheets

AXLE BEARING LUBRICATING AND COOLING SYSTEM

BACKGROUND OF THE INVENTION

1. Field of the Invention

The present invention relates to axle bearings and more particularly, to an axle bearing lubricating and cooling system, which guides a cooling fluid through the inside of the axle bearing to lubricate the axle bearing and to carry friction heat away from the axle bearing during rotation of the shaft in the axle bearing.

2. Description of the Related Art

A centrifugal separator is a machine utilizing high speed rotation to produce a centrifugal force for separating substances of different specific gravities. It is intensively used in food and medicine industries to separate different substances. During operation of a centrifugal separator, the shaft of the centrifugal separator is rotated at a high speed. When the speed of the shaft is increased, the friction between the shaft and the axle bearing that supports the shaft will be relatively increased, in consequence, much friction heat will be produced. Nowadays, 8000 rpm or even 12000 rpm centrifugal separators are commercially available. Due to high speed rotation, the axle bearing of a high speed centrifugal separator wears quickly with use. When the axle bearing of a centrifugal separator is at a high temperature status, the component parts may expand, shortening the gap between the inner and outer races of the axle bearing and the rolling members thereof. To cool down the axle bearing during operation of the centrifugal separator, a cooling fluid may be guided through the axle bearing to carry away friction heat. However, conventional axle bearing lubricating and cooling designs are not satisfactory in function.

SUMMARY OF THE INVENTION

The present invention has been accomplished under the circumstances in view. It is the main object of the present invention to provide an axle bearing lubricating and cooling system, which guides a cooling fluid through the inside of an axle bearing that supports a shaft, thereby lubricating the axle bearing and the shaft and carrying friction heat away from the axle bearing during rotation of the shaft to avoid axle bearing damage.

To achieve this and other objects of the present invention, an axle bearing lubricating and cooling system comprises a shaft unit and a positioning unit. The shaft unit comprises a shaft and an axle bearing supporting the shaft. The axle bearing comprises an inner race fixedly mounted around the shaft, an outer race and a plurality of movable members movably set in between the inner race and the outer race. The positioning unit comprises a casing defining therein an accommodation chamber that accommodates the axle bearing and a part of the shaft for enabling two distal ends of the shaft to extend out of the casing. The casing is fixedly connected with the outer race of the axle bearing, having at least one fluid inlet located on the top side thereof for guiding a cooling fluid from an external cooling fluid source into the accommodation chamber through the gap in between the outer race and inner race of the axle bearing and a fluid outlet located on the bottom side thereof for guiding the cooling fluid out of the accommodation chamber.

Further, the positioning unit comprises an impeller mounted on the shaft inside the accommodation chamber and below the axle bearing for rotation with the shaft to force the cooling fluid out of the axle bearing toward the fluid outlet.

DETAILED DESCRIPTION OF THE PREFERRED EMBODIMENT

Figure 1:
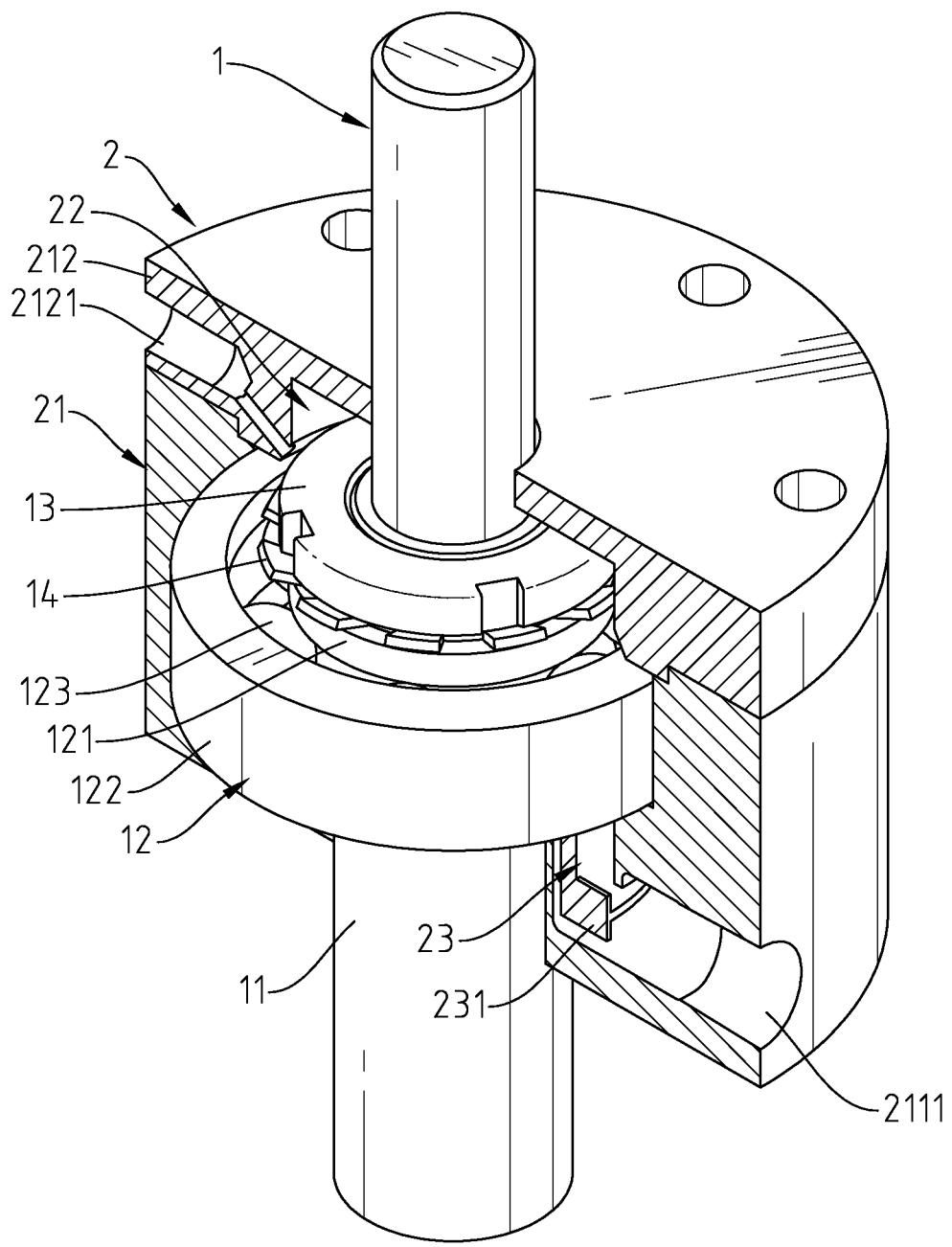
FIG. 1 is a sectional elevation of a part of an axle bearing lubricating and cooling system in accordance with the present invention.
Figure 2:
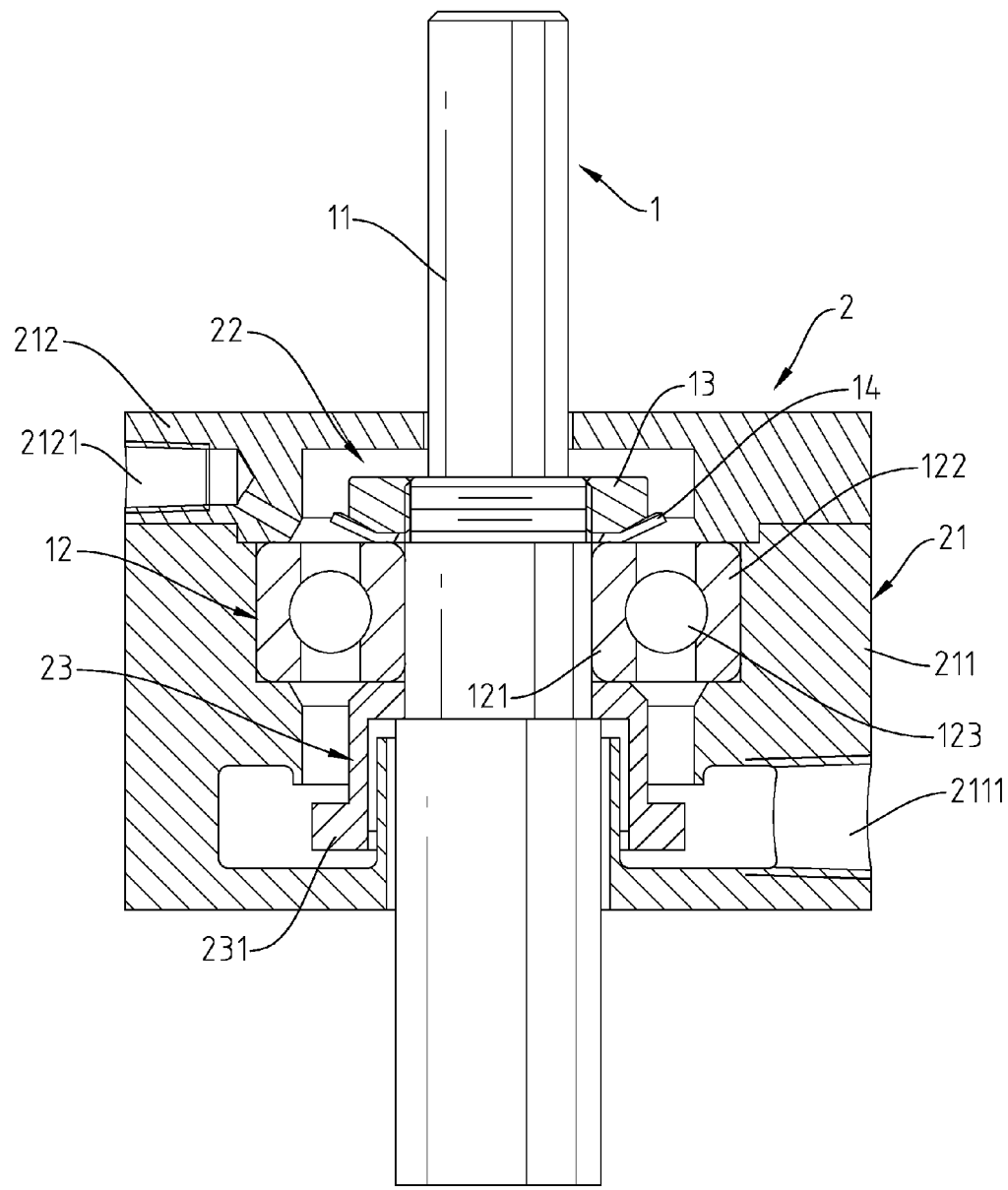
FIG. 2 is a sectional side view of the part of the axle bearing lubricating and cooling system shown in FIG. 1.
Figure 3:
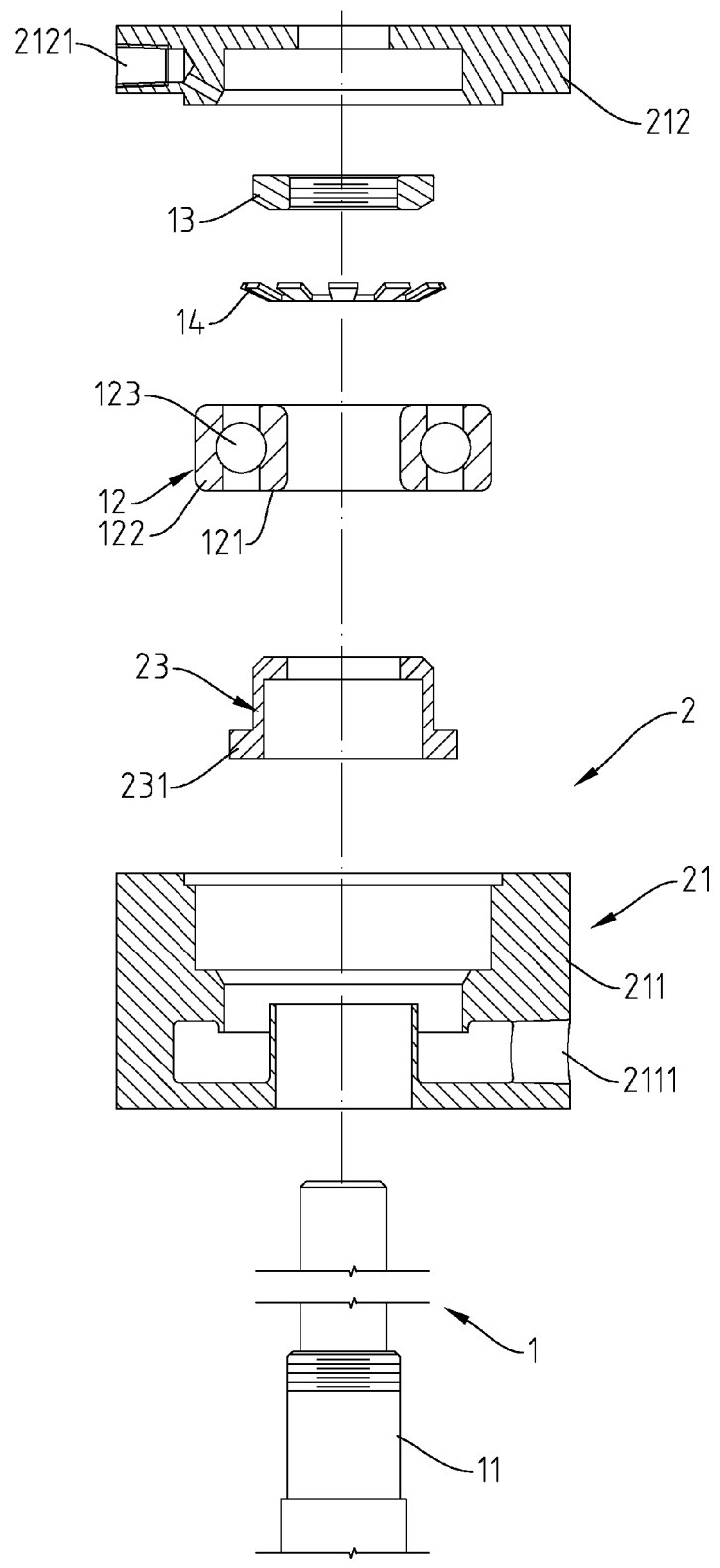
FIG. 3 is a sectional exploded view of the part of the axle bearing lubricating and cooling system shown in FIG. 1.
Figure 4:
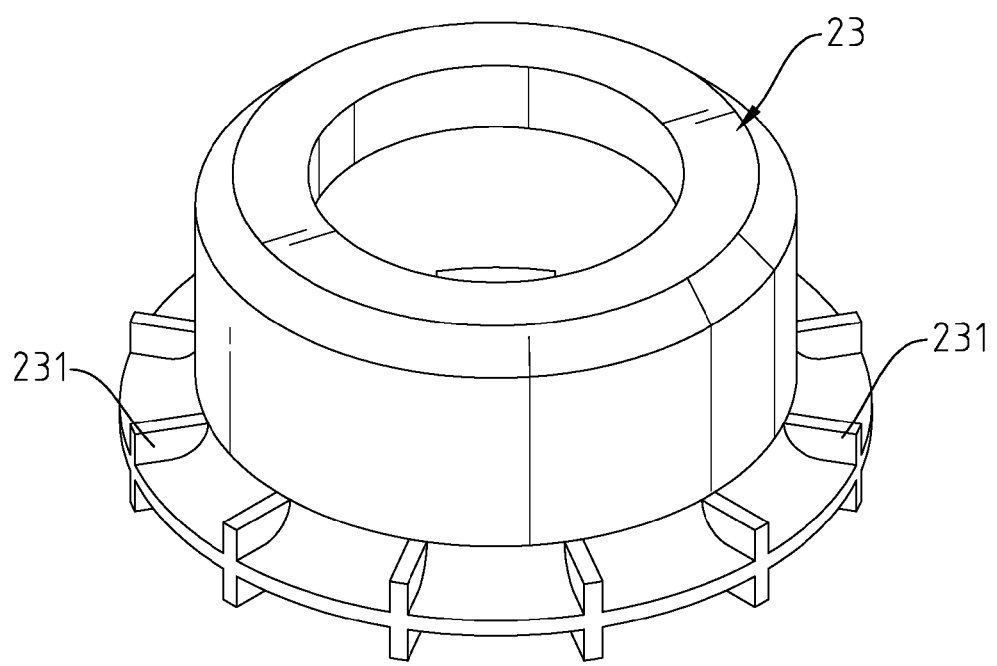
FIG. 4 is an elevational view of the impeller used in the axle bearing lubricating and cooling system shown in FIG. 1.

Referring to FIGS. 1-4, an axle bearing lubricating and cooling system in accordance with the present invention is shown comprising a shaft unit 1 and a positioning unit 2.

The shaft unit 1 comprises a shaft 11, an axle bearing 12, a lock member 13 and a washer 14. The axle bearing 12 has an inner race 121, an outer race 122 and movable members 123 set between the inner race 121 and the outer race 122. The movable members 123 can be, for example, rolling balls or needle rollers.

The positioning unit 2 comprises a casing 21 and an impeller 23. The casing 21 is formed of a body shell 211 and a top cover shell 212. The body shell 211 and the top cover shell 212 define therein an accommodation chamber 22. The impeller 23 has a plurality of impeller vanes 231 equiangularly spaced around the bottom side thereof. The top cover shell 212 has a fluid inlet 2121 on the periphery in communication with the accommodation chamber 22. The body shell 211 has a fluid outlet 2111 on the bottom side thereof in communication between the accommodation chamber 22 and the outside space.

During installation, the impeller 23, the inner race 121 of the axle bearing 12 and the washer 14 are sleeved onto the shaft 11 in proper order, and then the lock member 13 is fastened to the shaft 11 to lock the impeller 23 and the axle bearing 12 to the shaft 11. Thereafter, the shaft 11 is inserted through the body shell 211 of the casing 21 of the positioning unit 2, and then the top cover shell 212 is closed on the body shell 211 to let the axle bearing 12, the lock member 13 and the impeller 23 be accommodated in the accommodation chamber 22 and the two distal ends of the shaft 11 extend out of the body shell 211 and top cover shell 212 of the casing 21 of the positioning unit 2. At this time, the outer race 122 of the axle bearing 12 is affixed to the peripheral wall of the accommodation chamber 22 and the axle bearing 12 is disposed between the fluid inlet 2121 and the fluid outlet 211 so that the shaft 11, the inner race 121 and the impeller 23 are rotatable relative to the outer race 122 of the axle bearing 12 and the positioning unit 2.

Figure 5:
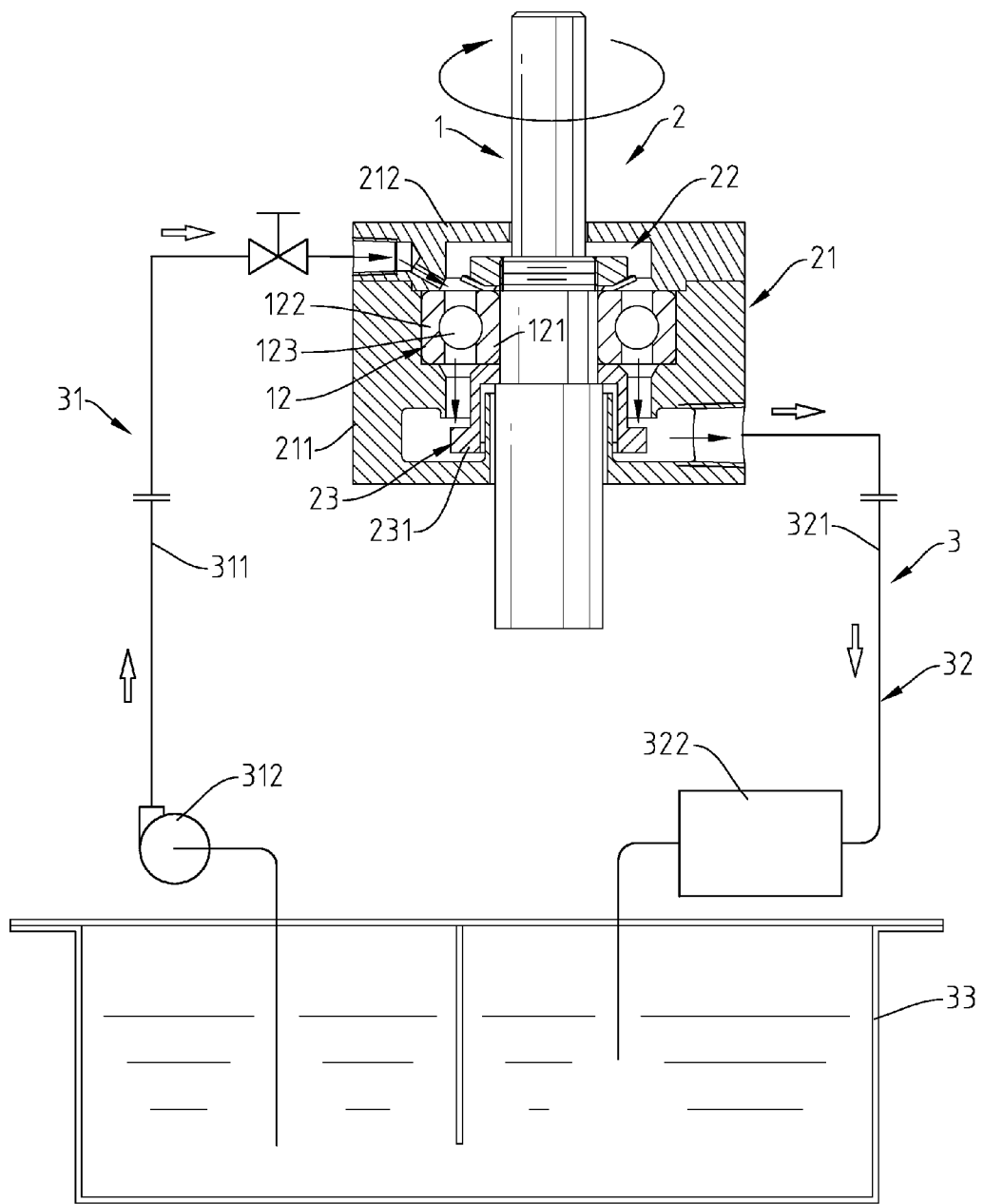
FIG. 5 is a schematic view showing an operation status of the part of the axle bearing lubricating and cooling system according to the present invention.

Referring to FIG. 5, the axle bearing lubricating and cooling system in accordance with the first embodiment of the present invention further comprises a cooling device 3 that has a fluid supply pipeline 31 connected to the fluid inlet 2121 of the casing 21 of the positioning unit 2, a fluid return pipeline 32 connected to the fluid outlet 2111 of the casing 21 of the positioning unit 2, and a cooling fluid reservoir 33 connected between the fluid supply pipeline 31 and the fluid return pipeline 32 and holding a cooling fluid. The fluid supply pipeline 31 comprises a fluid supply pipe 311 connected between the fluid inlet 2121 of the casing 21 of the positioning unit 2 and the cooling fluid reservoir 33, and a pump 312 adapted for pumping the cooling fluid out of the cooling fluid reservoir 33 through the fluid supply pipe 311 into the fluid inlet 2121 of the casing 21 of the positioning unit 2. The fluid return pipeline 32 comprises a fluid return pipe 321 connected between the fluid outlet 2111 of the casing 21 of the positioning unit 2 and the cooling fluid reservoir 33, and a cooler 322 adapted for cooling the cooling fluid that flows out of the fluid outlet 2111 of the casing 21 of the positioning unit 2 through fluid return pipe 321 toward the cooling fluid reservoir 33.

Thus, when the shaft 11 of the shaft unit 1 is rotating, the inner race 121 is being rotated with the shaft 11, causing friction between the movable members 123 and the inner race 121/outer race 122. Friction between the movable members 123 and the inner race 121/outer race 122 causes the axle bearing 12 to become hot. At this time, the pump 312 of the fluid supply pipeline 31 is started to pump the cooling fluid out of the cooling fluid reservoir 33 through the fluid supply pipe 311 into the fluid inlet 2121 of the casing 21 of the positioning unit 2. Because the fluid inlet 2121 of the casing 21 of the positioning unit 2 is disposed above the axle bearing 12, the cooling fluid flows downwardly through the gap in between the inner race 121 and outer race 122 of the axle bearing 12 to the bottom side in the accommodation chamber 22. When the cooling fluid is flowing downwardly through the gap in between the inner race 121 and outer race 122 of the axle bearing 12, it touches inner race 121, the outer race 122 and the movable members 123 directly, thereby carrying friction heat away from the axle bearing 12 rapidly. Due to rapid movement between the inner race 121 and the movable members 123, the flowing speed of the cooling fluid is interrupted and slowed down while the impeller 23 is rotating with the shaft 11. However, a significant pressure difference is produced between the top side of the axle bearing 12 and the bottom side of the axle bearing 12 at this time. There is also a significant pressure difference between the area around the impeller 23 and the area in the fluid return pipe 321. Thus, the cooling fluid can pass through the axle bearing 12 into the fluid return pipe 321 rapidly. Further, during movement of the impeller vanes 231 of the impeller 23, a centrifugal force is produced to force the cooling fluid out of the accommodation chamber 22 into the fluid return pipe 321. When the cooling fluid is flowing through the fluid return pipe 321 to the cooling fluid reservoir 33, it is cooled down by the cooler 322. Subject to the effect of the cooling fluid, the axle bearing 12 is lubricated and cooled down, and maintained constantly within the working range. Further, when the cooling fluid is flowing through the axle bearing 12, it lubricates the inner race 121, the outer race 122 and the movable members 123, reducing wear and friction and prolonging the lifespan of the axle bearing 12.

Figure 6:
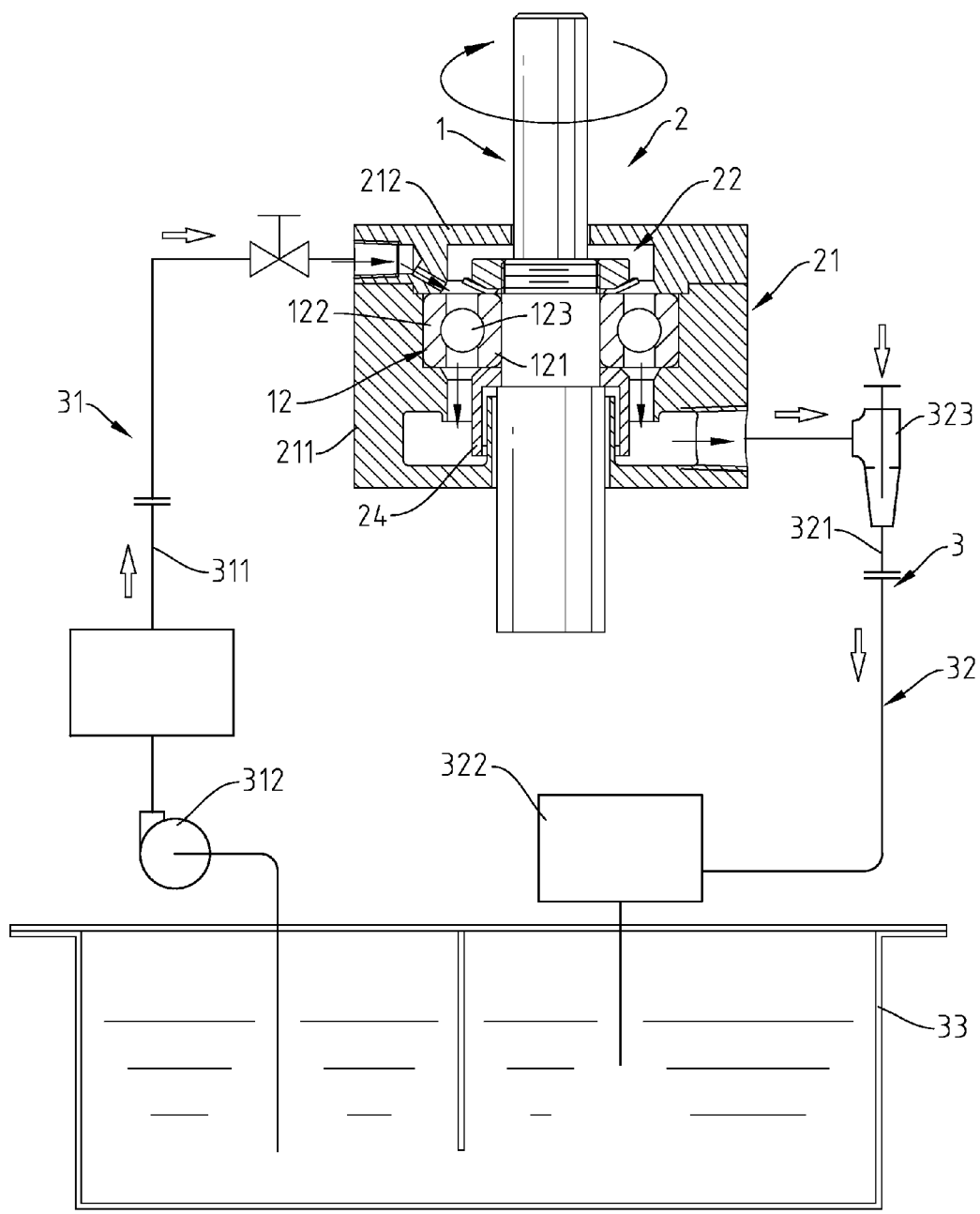
FIG. 6 is a schematic sectional view of an alternate form of the axle bearing lubricating and cooling system according to the present invention, showing a jet pipe installed in the fluid return pipe of the fluid return pipeline and an oil slinger mounted in the bottom side of the axle bearing.

In an alternate form of the present invention as shown in FIG. 6, a jet pipe 323 is installed in the fluid return pipe 321 of the fluid return pipeline 32, and an oil slinger 24 is mounted in the bottom side of the axle bearing 12. During operation, the jet pipe 323 increases the difference between the pressure in the fluid return pipe 321 and the pressure in the accommodation chamber 22, thereby accelerating the flowing speed of the cooling fluid through the accommodation chamber 22. Accelerating the flowing speed of the cooling fluid through the accommodation chamber 22 causes an increase of the flow rate of the cooling fluid flowing through the shaft 11, and therefore cooling of the axle bearing 12 is enhanced.

Figure 7:
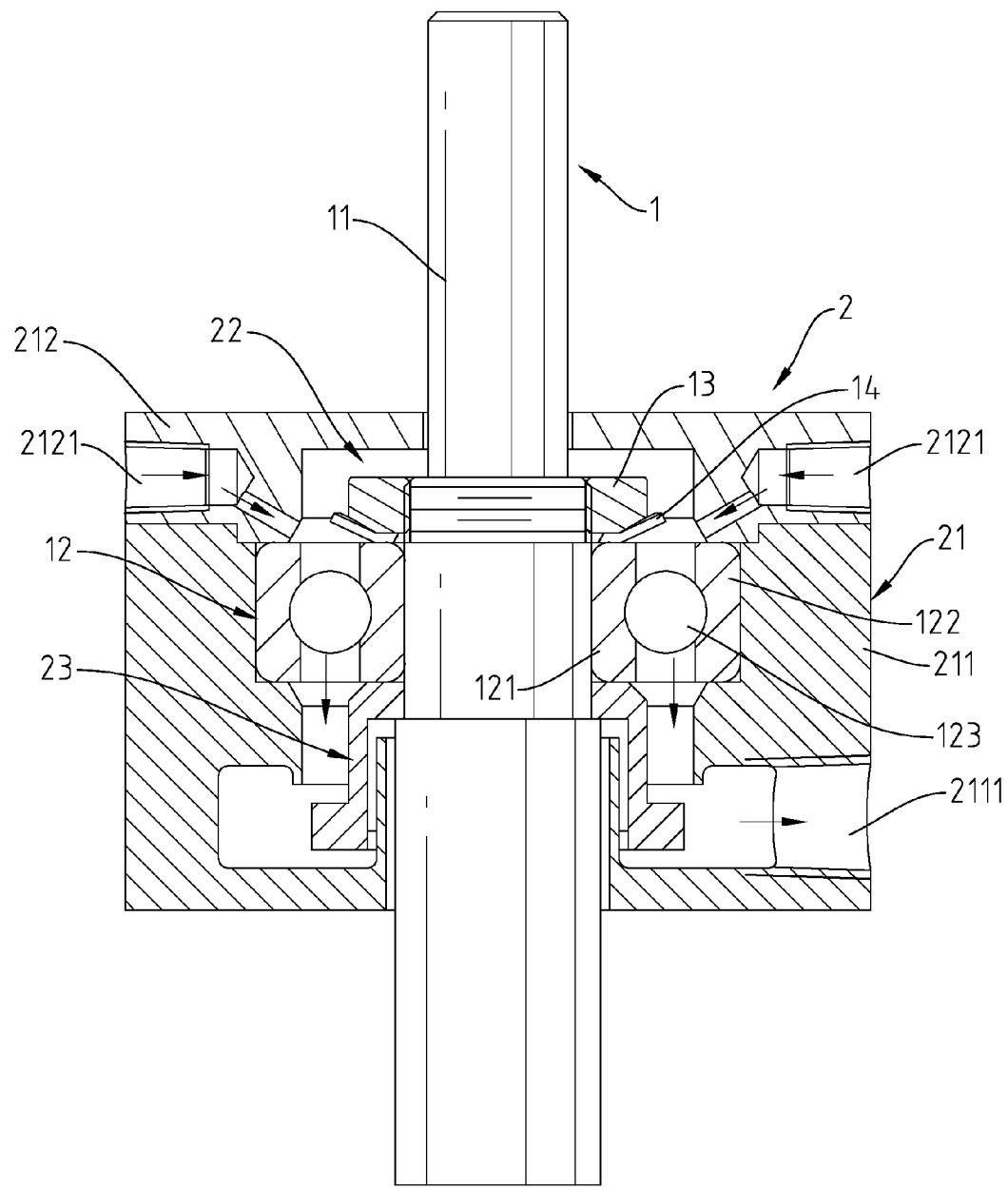
FIG. 7 is a sectional side view of a part of another alternate form of the axle bearing lubricating and cooling system according to the present invention.
Figure 8:
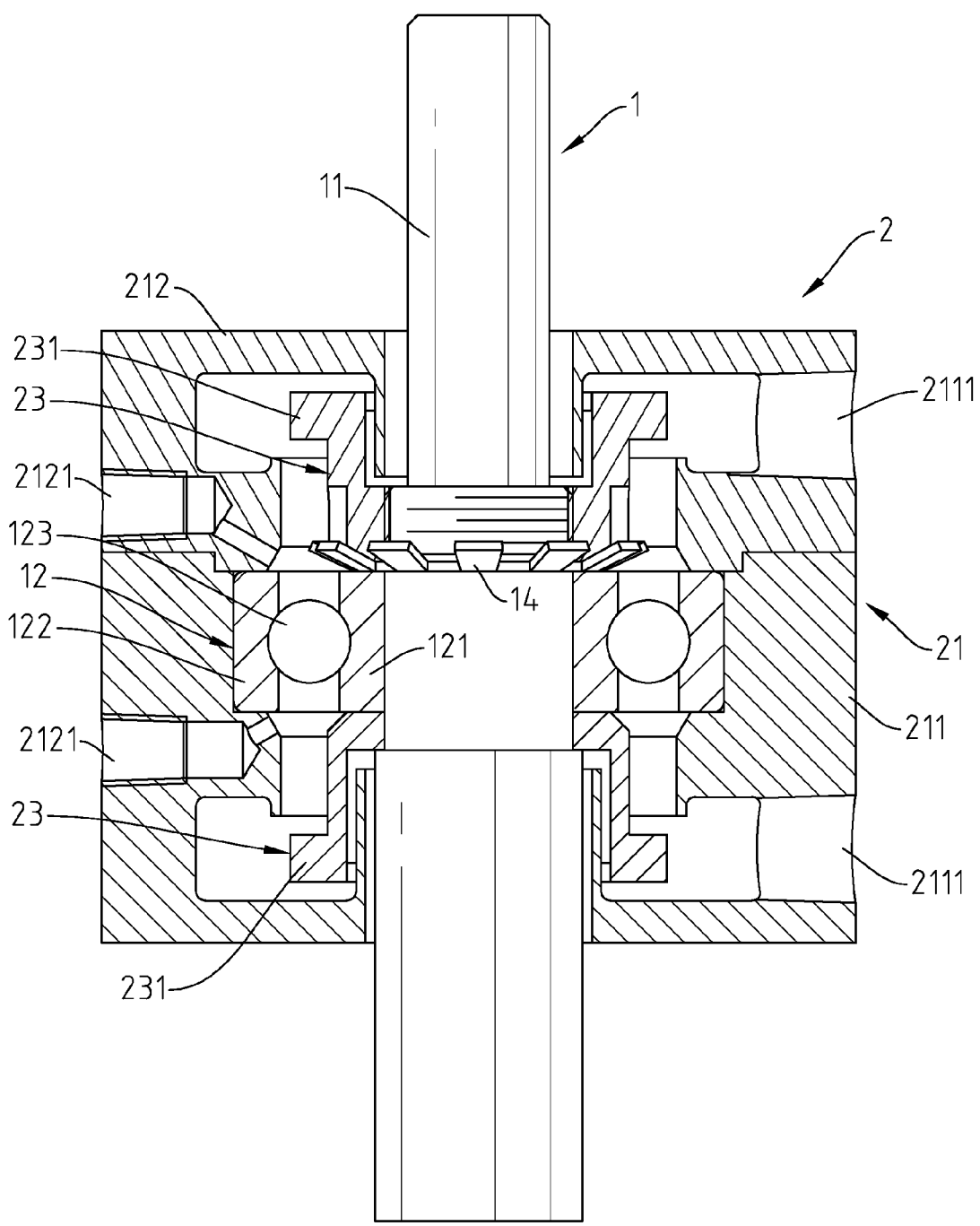
FIG. 8 is a sectional side view of a part of still another alternate form of the axle bearing lubricating and cooling system according to the present invention.
Figure 9:
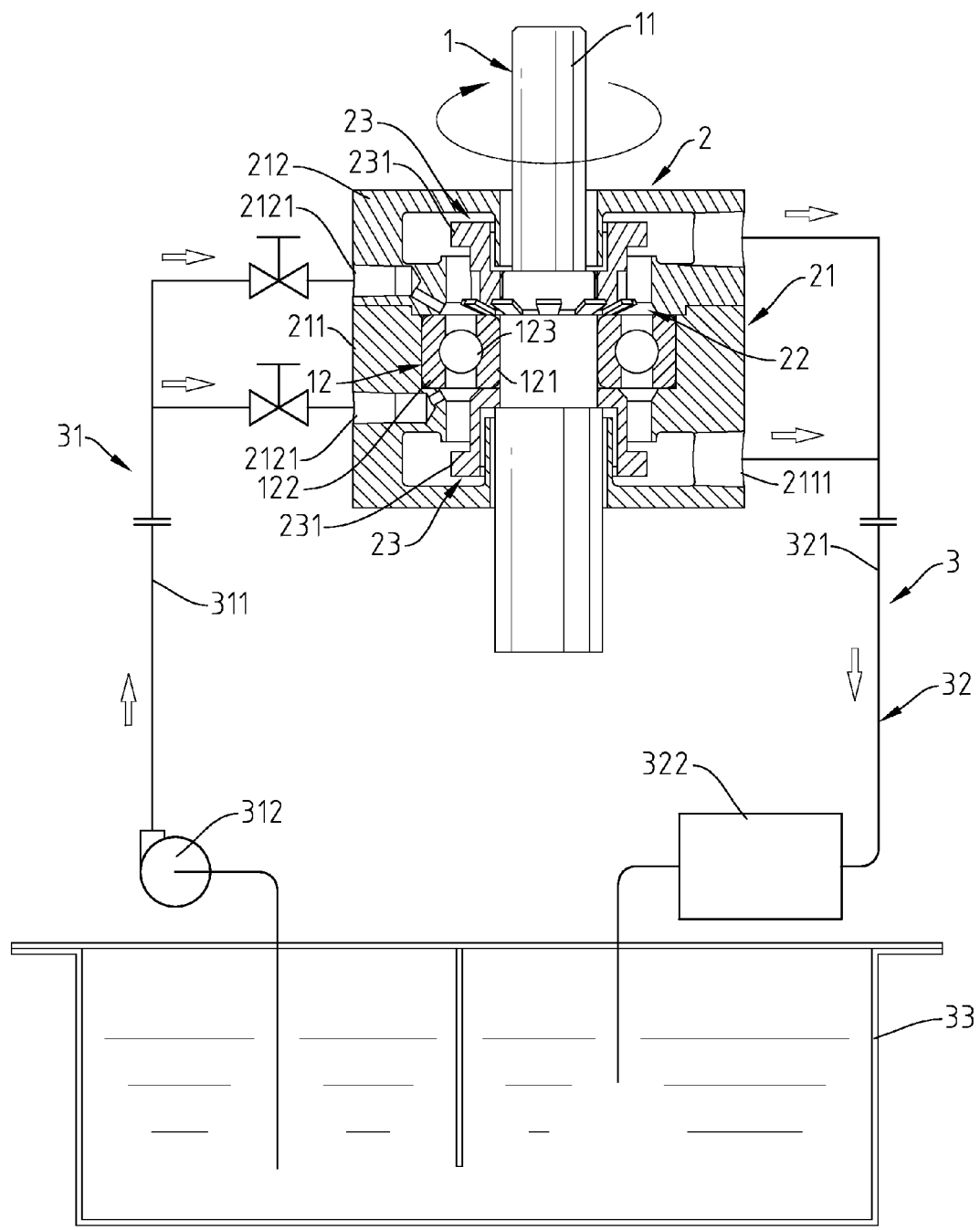
FIG. 9 is an applied view of the axle bearing lubricating and cooling system shown in FIG. 8 (I).
Figure 10:
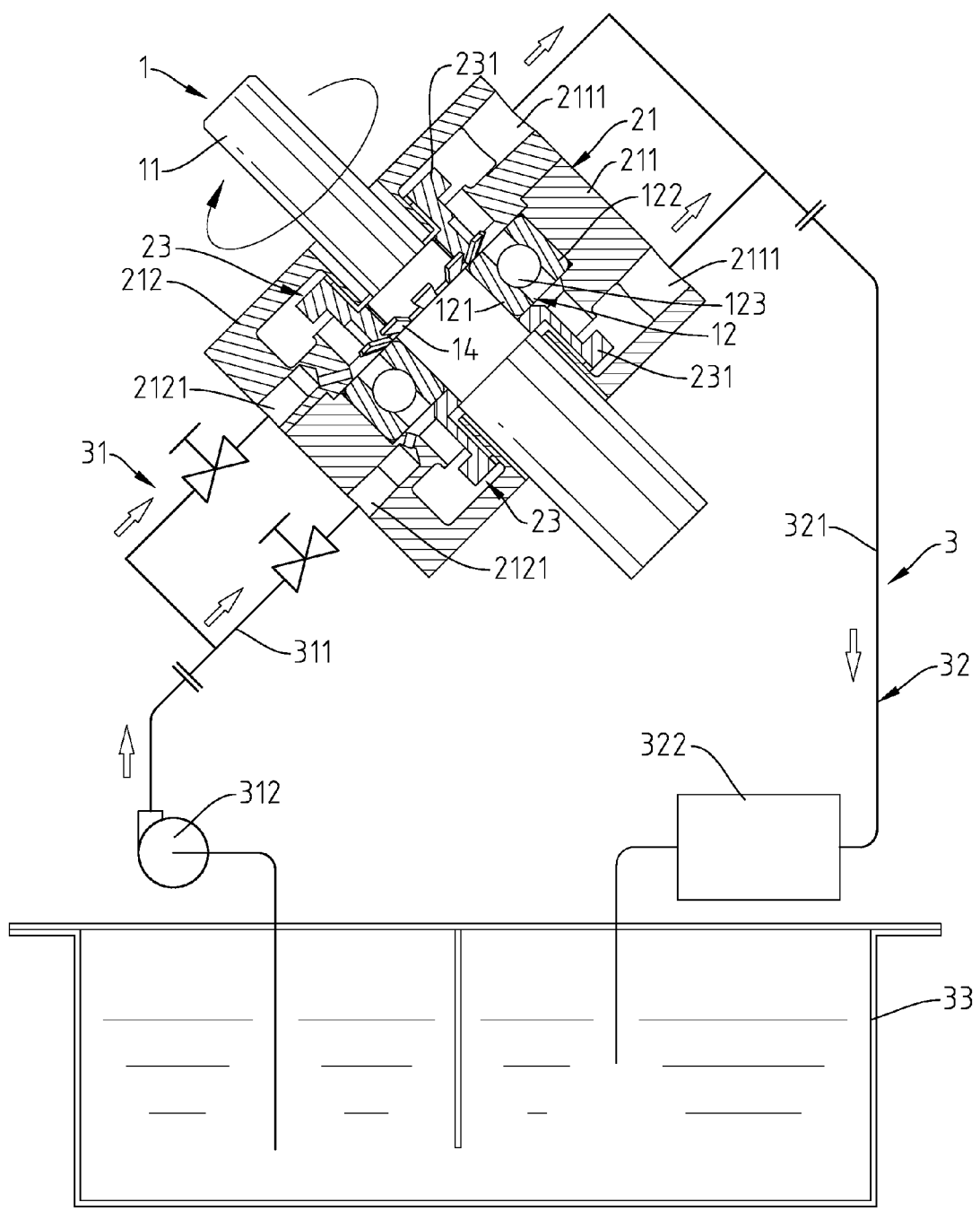
FIG. 10 is an applied view of the axle bearing lubricating and cooling system shown in FIG. 8 (II).
Figure 11:
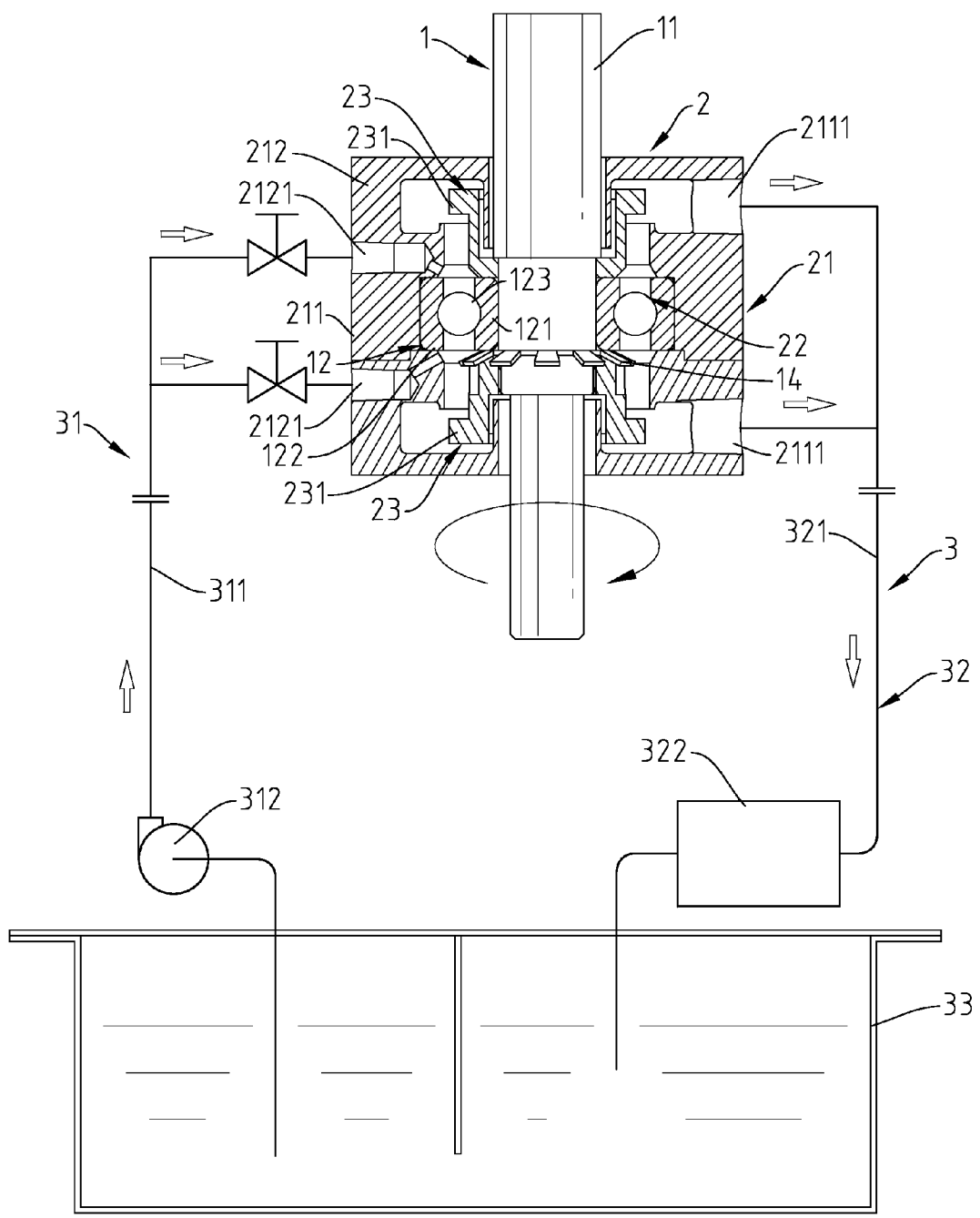
FIG. 11 is an applied view of the axle bearing lubricating and cooling system shown in FIG. 8 (III).

FIG. 7 is a sectional side view of a part of another alternate form of the axle bearing lubricating and cooling system according to the present invention. This embodiment is substantially similar to the embodiment shown in FIGS. 1-5 with the exception that the top cover shell 212 of the casing 21 has a plurality of fluid inlets 2121 spaced around the periphery in communication with the accommodation chamber 22, and the body shell 211 has a fluid outlet 2111 on the bottom side thereof in communication between the accommodation chamber 22 and the outside space.

Referring to FIGS. 8-11 illustrate still another alternate form of the axle bearing lubricating and cooling system. As illustrated, fluid inlets 2121 and fluid outlets 2111 are respectively symmetrically located on the body shell 211 and top cover shell 212 of the casing 21 at two opposite sides at different elevations; two impellers 23 are mounted on the shaft 11 at different elevations and spaced by the axle bearing 12. The casing 21 of the positioning unit 2 can be set in vertical (see FIG. 9), tilted (see FIG. 10) or upside down (see FIG. 11) subject to different application requirements.

In conclusion, the technical feature of the present invention that overcome the drawbacks of the conventional designs is the measure of guiding a cooling fluid through the gap in between the inner race 121 and outer race 122 of the axle bearing 12 during rotation of the shaft 11, so that friction heat can be rapidly carried away from the axle bearing 12, avoiding axle bearing damage. Further, guiding the cooling fluid through the gap in between the inner race 121 and outer race 122 of the axle bearing 12 during rotation of the shaft 11 simultaneously lubricates the axle bearing 12, thereby prolonging the lifespan of the axle bearing 12.

Although particular embodiments of the invention have been described in detail for purposes of illustration, various modifications and enhancements may be made without departing from the spirit and scope of the invention.

What the invention claimed is:

1. An axle bearing lubricating and cooling system, comprising:
    a shaft unit, said shaft unit comprising a shaft and an axle bearing supporting said shaft, said axle bearing comprising an inner race fixedly mounted around said shaft, an outer race and a plurality of movable members movably set in between said inner race and said outer race; and
    a positioning unit, said positioning unit comprising a casing defining therein an accommodation chamber that accommodates said axle bearing and a part of said shaft for enabling two distal ends of said shaft to extend out of said casing, said casing being fixedly connected with said outer race of said axle bearing, said casing having a plurality of fluid inlets arranged at a side thereof at different elevations for guiding a cooling fluid from an external cooling fluid source into said accommodation chamber through a gap in between said outer race and said inner race of said axle bearing and a plurality of fluid outlets arranged at an opposite side thereof at different elevations for guiding said cooling fluid out of said accommodation chamber.

2. The axle bearing lubricating and cooling system as claimed in claim 1, wherein said casing comprises a body shell and a top cover shell covering a top open side of said body shell, said body shell and said top cover shell defining therein said accommodation chamber.

3. The axle bearing lubricating and cooling system as claimed in claim 1, wherein said positioning unit further comprises two impellers respectively mounted on said shaft inside said accommodation chamber above and below said axle bearing for rotation with said shaft to force said cooling fluid out of said axle bearing toward said fluid outlets.

4. The axle bearing lubricating and cooling system as claimed in claim 1, wherein said positioning unit further comprises two impellers respectively mounted on said shaft inside said accommodation chamber above and below said axle bearing for rotation with said shaft to force said cooling fluid out of said axle bearing toward said fluid outlets, each said impeller having a plurality of impeller vanes equiangularly spaced around a bottom side thereof.

* * * * *